Nov. 29, 1938.  K. B. HOWELL  2,138,064
COMBINATION REDUCING VALVE AND DESUPERHEATER
Filed April 18, 1936   3 Sheets-Sheet 3
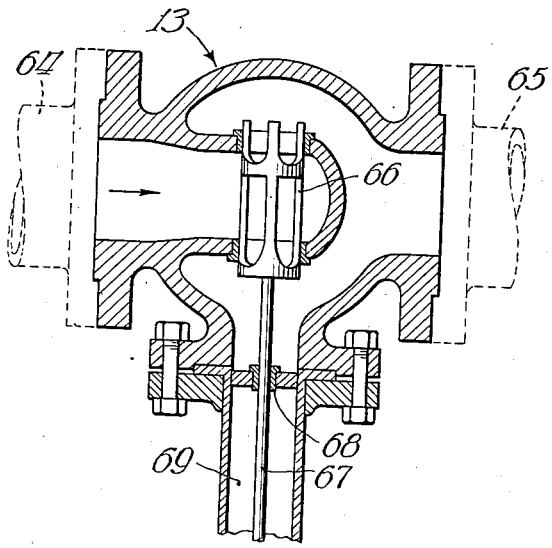
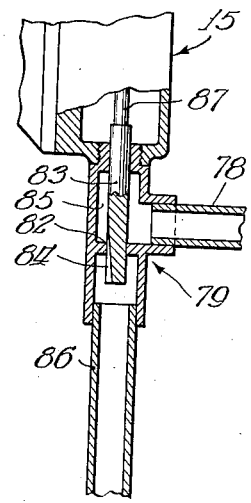
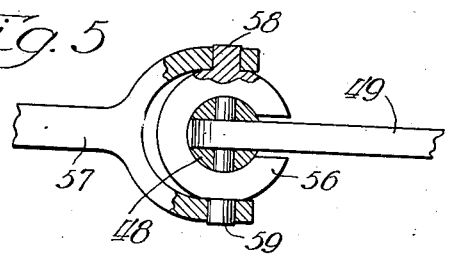
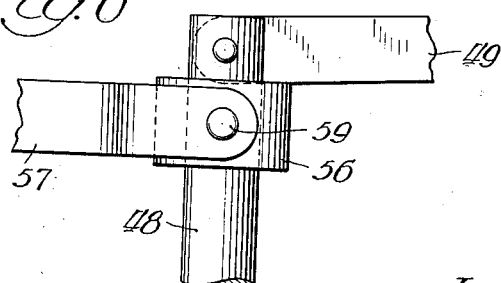
Inventor:
Kenneth B. Howell.

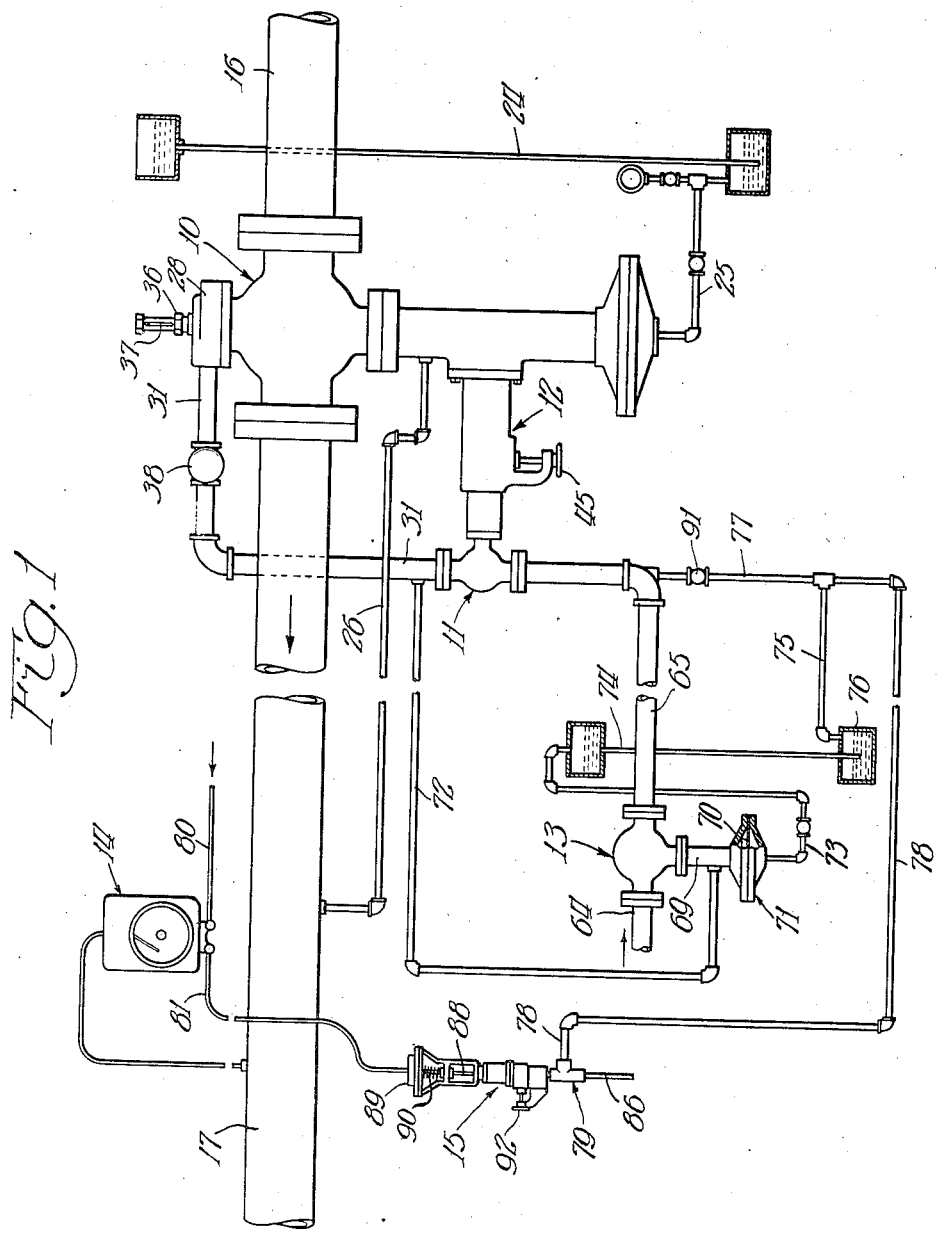

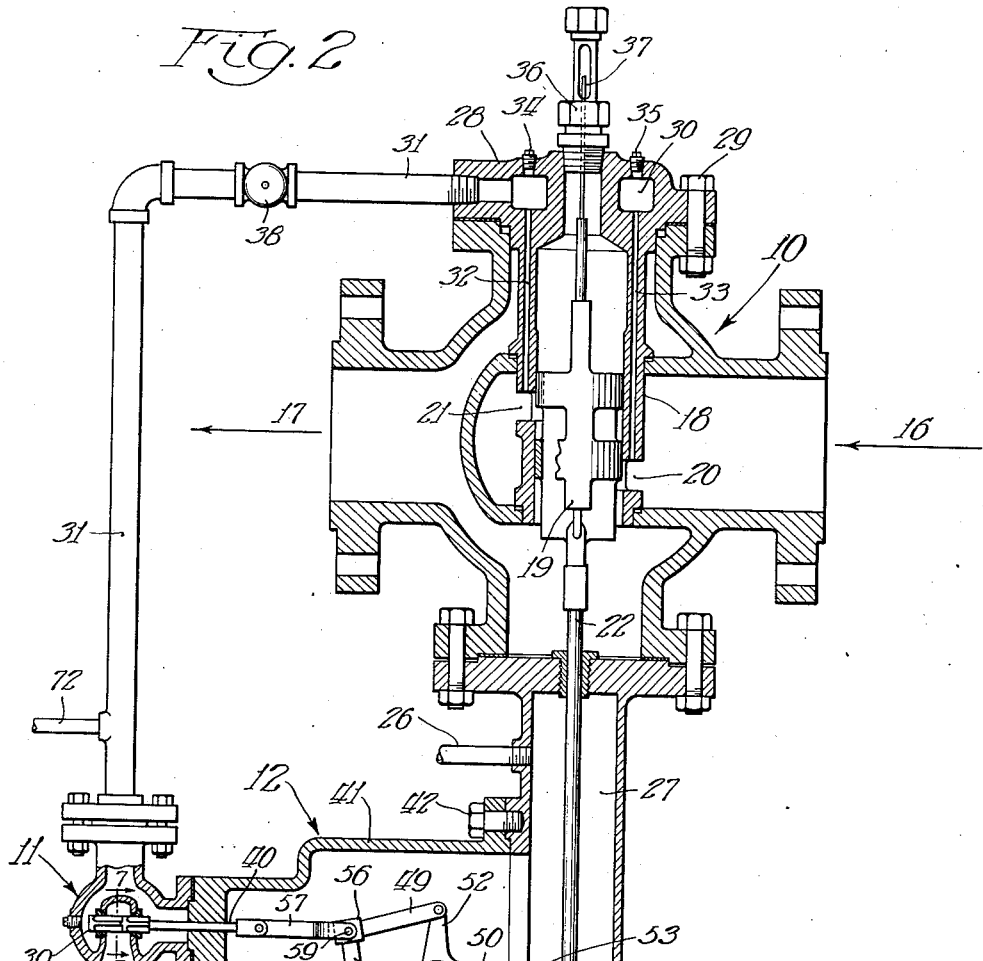
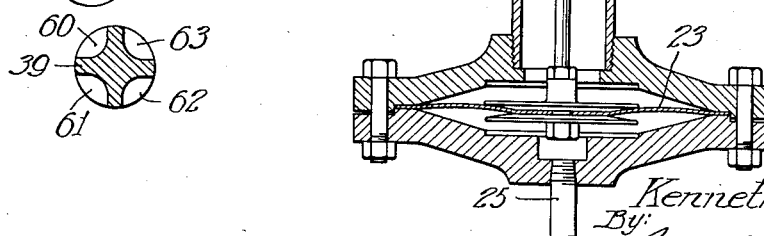

Patented Nov. 29, 1938

2,138,064

UNITED STATES PATENT OFFICE 2,138,064

COMBINATION REDUCING VALVE AND DE-SUPERHEATER

Kenneth B. Howell, Milwaukee, Wis.

Application April 18, 1936, Serial No. 75,098

7 Claims. (Cl. 122—479)

This invention relates to the control of steam and more particularly to combined pressure regulation and desuperheating of steam.

The principal purpose of the invention is to provide a control system whereby the admission of water for desuperheating the steam is jointly controlled by the demand for steam and the temperature of the steam.

It is a further purpose of the invention to provide a system of this character wherein the joint control may be operated to suit conditions whereby to avoid over or under supply of water for desuperheating and to obtain the best working conditions for any particular installation.

It is a further purpose of the invention to provide a system of this character wherein the desuperheating water in the right amounts may be always injected into the steam at the point of maximum steam velocity.

Other and more specific objects and advantages of the invention will appear as the description proceeds in connection with the accompanying drawings. It is to be understood, however, that the drawings and description are illustrative only and are not to be taken as limiting the invention except in so far as it is limited by the claims.

In the drawings—

Fig. 1 is a diagrammatic view illustrating the manner of connecting up the several control elements;

Fig. 2 is a sectional view taken vertically through the pressure regulator and desuperheater valves showing the manner in which the water for desuperheating is supplied to the steam;

Fig. 3 is a sectional view of the valve employed for controlling the pressure of the desuperheating water;

Fig. 4 is a sectional view through the bleed valve structure whereby temperature control of the desuperheating water is effected;

Figs. 5 and 6 are enlarged fragmentary views illustrating the mechanism for regulating the supply of desuperheater water increase with the steam demand; and Fig. 7 is an enlarged sectional view on the line 7—7 of Fig. 2.

Referring now in detail to the drawings, the device employed in this control system comprises a combined pressure regulating and desuperheating valve 10 which is shown most clearly in section in Fig. 2, a water supply valve 11 adapted to supply desuperheating water to the valve 10, a control device 12 for regulating the valve 11 directly from the pressure regulating valve 10, a water pressure control valve 13 for controlling the water pressure supplied to the valve 11, a temperature responsive device 14, and a control mechanism 15 cooperating with said temperature responsive device to effect variations in the water pressure supplied to the valve 11.

Briefly stated, the function of the combined pressure regulating and water introducing valve 10 is to control the supply of steam and to provide for the introduction of desuperheating water at the valve ports of this valve where the maximum velocity of the steam is reached. The valve 10 is a reducing valve which is operated to maintain a substantially constant pressure on the downstream side. Combined with the valve 10, the control device 12 operates to effect an opening of the valve 11 which is proportional to the opening of the valve 10 and therefore to the steam supply in a steam line such as is indicated by the pipes 16 and 17.

Referring now to Figures 1 and 2, it will be noted that the valve 10 contains a sleeve 18 in which a movable valve 19 is adjusted vertically to control the flow of steam through the valve ports 20 and 21. The valve member 19 is connected by means of a stem 22 to a diaphragm 23. One side of the diaphragm 23 is subjected to pressure from a mercury column 24 through a pipe 25. The other side of the diaphragm 23 is subjected to the downstream pressure in outlet pipe 17 by a pipe 26 that leads into a chamber 27 which is opened directly to the upper side of the diaphragm 23.

Thus, upon any increase in demand which would result in a drop in pressure in the pipe 17, the diaphragm 23 would rise, thereby moving the valve stem 22 upwardly to open the valve ports 20 and 21 wider to increase the supply of steam. Likewise, in the event of a falling off in demand, the pressure in the pipe 17 would build up thereby causing the valve stem 22 to move down and close the ports 20 and 21.

The sleeve 18 is carried by a head 28 which is mounted upon the body of the valve 10 in any suitable manner such as by means of bolts 29. This head 28 has therein a distributing channel 30 adapted to receive desuperheating water from a supply pipe 31. The sleeve 18 has a plurality of passages 32 and 33 running from the channel 30 to the valve ports 20 and 21 and opening directly on these ports. Thus, desuperheating water is supplied directly to the valve ports 20 and 21 where the steam flow reaches its maximum velocity. Access to the channel 30 may be had by removing suitable plugs 34 and 35. A valve position indicating device 36 is mounted on the head 28 and consists of a plug through which a stem 37 on the valve member 19 may be projected to indicate the position of the valve member 19.

The desuperheater water supply pipe 31 leads through an ordinary control valve 38 to the water supply valve 11. This water supply valve 11 has its movable valve member 39 operated by a stem 40 which is linked by the control device 12, to be described, to the stem 22 in order to regulate the opening of the valve member 39 in proportion to the movement of the valve stem 22.

The control device 12 is located in the housing 41 secured to the casing 27 by suitable bolts 42. The housing 41 has a bracket 43 providing a bearing 44 for a regulating handle 45 by means of which an adjusting stem 46 is raised or lowered. The adjusting stem 46 extends into the housing 41 through a packing 47. At its upper end, the stem 46 has pivoted thereto a link 48.

This link 48 is connected by a second link 49 to a bell crank 50 which is pivoted by means of a shaft 51 in the housing 41. The link 49 connects to one arm 52 of the bell crank 50 and the other arm 53 of this bell crank is provided with an elongated slot 54 fitting over a pin 55 which is provided on the valve stem 22.

Slidable on the link 48 is a collar 56 which is connected by means of a link 57 to the stem 40 of the valve member 49. The link 57 is pivoted on the collar 56 by means of a pair of trunnions 58 and 59.

The mechanism just described serves to operate the valve member 39 directly from the valve stem 22 so that the opening of the valve member 39 is proportional to the opening of the valve member 19. The degree of movement of the valve member 39 for any specific movement of the stem 22 can be regulated by means of the handle 45. If the handle 45 is operated to raise its stem 46 and therefore the links 48 and 49, these links 48 and 49 will be moved upwardly with respect to the collar 56 and the link 57 so as to shorten the endwise movement of the link 57 for any given movement of the arm 52 of the bell crank 50. Thus, the degree of movement imparted to the valve member 39 may be adjusted to any desired value.

The valve member 39 is shown in cross section in Fig. 7. This valve member is provided with suitable grooves 60, 61, 62 and 63. In constructing the valve member 39, the cross sectional area of the grooves is figured so as to give the correct amount of water flow in proportion to steam flow in the valve 10.

With a fixed pressure of water being supplied to the valve 11, desuperheating water will be supplied at the ports 20 and 21 in proportion to the degree of opening of these ports and therefore in proportion to the amount of steam supplied.

The present invention contemplates means for controlling the pressure of water supplied to the valve 11. For this purpose, a pressure regulating valve 13 is inserted in the water supply line to the valve 11. The valve 13 receives its water from an incoming pipe 64 and delivers water to the valve 11 through a pipe 65. This valve has a movable valve member 66 (see Fig. 3) of the well known balanced valve type which member is moved by a stem 67 passing through a packing gland 68 into a chamber 69 that is open to a diaphragm 70 in a diaphragm housing 71.

The chamber 69 is in direct communication with the pipe 31 by means of a pipe 72 so that one side of the diaphragm 70 is subjected to the pressure of the desuperheating water as it is supplied to the valve 10.

The other side of the diaphragm 70 is subjected to a pressure which is variable in response to temperature changes of the steam in the pipe 17.

The mechanism whereby this pressure is supplied to the diaphragm 70 comprises a pipe 73 leading to the top of a mercury column 74 which mercury column is connected to a pipe 75 leading to the lower pot 76 of the mercury column. The pipe 75 is a branch from a bleed conduit or pipe 77 that is tapped off of the supply pipe 65 for the valve 11. To control the pressure in the pipe 75, the pipe 77 is connected by a pipe 78 to a bleed valve 79 which is automatically adjusted in response to temperature changes in the pipe 17 by means of the temperature responsive device 14.

The particular details of the temperature responsive device are not a part of the present invention. However, the combination of this device with the other mechanism described such as the bleed valve 79 is a part of the present invention. The temperature responsive device 14 merely controls the flow of air through pipes 80 and 81 from a suitable pressure source not shown and the air pressure through the pipe 81 is supplied to the bleed valve control device 15. The temperature responsive device 14 is so constructed that the air pressure supplied to the pipe 81 decreases in response to temperature increase in the pipe 17.

The bleed valve control mechanism 15 embodies a bleed valve such as shown in detail in Fig. 4 and which comprises a bleed valve port 82, a valve member 83 having a groove 84 therein that gradually increases in size toward the free end of the valve member 83. The pipe 78 supplies pressure to a chamber 85 around the valve member 83 and a discharge pipe 86 leading to atmosphere, or some other low pressure outlet, conducts the water discharged through the valve groove 84 to a point of discharge. The valve member 83 has a stem 87 that is operated by the mechanism 15 from a suitable stem 88.

A linkage mechanism similar to that shown in the housing 41 for controlling the movement of the valve stem 40 is utilized for adjusting the movement of the valve stem 87 in response to movement of the stem 88. The stem 88 is preferably driven from a diaphragm, not shown, which is balanced in a housing 89 between a spring 90 and the air pressure in the air line 81. The operation of this mechanism is substantially as follows:

For a given setting of the bleed valve member 83, the spring 90 balances the pressure of air supplied through the conduit 81. Now, however, if the air pressure through the conduit 81 is reduced due to an increase in temperature in the pipe 17, this will result in an unbalanced condition whereby the spring 90 will move up to lift the stem 88 until a new balance is reached between the spring 90 and the pressure in the conduit 81. This movement is communicated through the linkage mechanism 15 to the valve stem 87 so as to lift the bleed valve member 83 and increase the port opening.

Increasing the port opening lowers the pressure in the pipe 77 and thus the pressure in the pipe 75. This causes a drop in the pressure supplied by the pipe 73 against the lower side of the diaphragm 70. This will cause the valve stem 67 to be moved downwardly increasing the opening of the valve 66 and supplying water at a higher pressure to the supply pipe 65. The pipe 77 of course, has a suitable valve 91 therein for controlling the flow through it.

The degree of opening of the valve member 83 may be controlled by a hand wheel 92 controlling the link mechanism of the device 15 in the same manner as the handle 45 controls the link mechanism in the housing 41.

From the above description, it is believed that the construction and operation of this device will be readily apparent to those skilled in this art.

Having thus described my invention what I claim as new and desire to secure by Letters Patent is:

1. A system of the character described comprising a steam supply conduit, a valve for regulating the rate of flow of steam in said conduit, means for injecting water into said steam in said conduit, means respective to changes in rate of flow of steam through said conduit for varying the amount of water supplied, said last named means comprising a water conduit for supplying water to said steam conduit, a control valve therein, and mechanism connecting the water control valve with the steam valve for moving the water control valve in proportion to the movements of the steam valve, said mechanism including a manually operable device for changing the ratio of water control valve movement to steam valve movement.

2. A system of the character described comprising a steam conduit, a valve in said conduit controlling the rate of flow of steam through said conduit, means for injecting water into the steam as it passes through said valve, said means comprising a supply pipe leading from a suitable source of water supply, a water valve in the supply pipe, pressure regulating means maintaining a predetermined pressure drop across said last named valve, and means responsive to the movement of the steam control valve for controlling the degree of opening of said water valve.

3. A system of the character described comprising a steam conduit, a valve in said conduit controlling the rate of flow of steam through said conduit, means for injecting water into the steam as it passes through said valve, said means comprising a supply pipe leading from a suitable source of water supply, a water valve in the supply pipe, pressure regulating means maintaining a predetermined pressure drop across said last named valve, means responsive to the temperature of steam in said conduit for varying the pressure drop across said last named valve, and means responsive to the movement of the steam control valve for controlling the degree of opening of said water valve.

4. A system of the character described comprising a steam conduit, a valve in said conduit controlling the rate of flow of steam through said conduit, means for injecting water into the steam as it passes through said valve, said means comprising a supply pipe leading from a suitable source of water supply, a water valve in the supply pipe, pressure regulating means maintaining a predetermined pressure drop across said last named valve, means responsive to the temperature of steam in said conduit for varying the pressure drop across said last named valve, and means responsive to the movement of the steam control valve for controlling the degree of opening of said water valve, said pressure regulating means and temperature responsive means comprising a valve in said water supply pipe, a diaphragm controlling the degree of opening of said last named valve, a conduit connecting the outlet side of said water valve to one side of the diaphragm, a conduit connecting the other side of said diaphragm to the inlet side of said water valve, one of the two last named conduits having means responsive to the temperature in the steam conduit to vary the pressure differential between the water valve and the diaphragm.

5. In a system of the character described, a combined pressure regulating and desuperheating valve adapted to be inserted in a steam supply line, a water supply valve controlling the supply of the desuperheating water to the first named valve, means actuated by movement of the first named valve for varying the opening of the water supply valve in proportion to the change of opening of the first named valve, a water pressure control valve controlling the supply of water to said water supply valve, means for moving said control valve in response to variations in pressure drop across said water supply valve whereby to maintain a set pressure drop across the water supply valve, and means responsive to the temperature of the steam for moving the water pressure control valve whereby to vary the set pressure drop across the water supply valve.

6. In a system of the character described, a combined pressure regulating and desuperheating valve adapted to be inserted in a steam supply line, a water supply valve controlling the supply of the desuperheating water to the first named valve, means actuated by movement of the first named valve for varying the opening of the water supply valve in proportion to the change of opening of the first named valve, a water pressure control valve controlling the supply of water to said water supply valve, means for moving said control valve in response to variations in pressure drop across said water supply valve whereby to maintain a set pressure drop across the water supply valve, and means for adjusting the water pressure control valve whereby to vary the set pressure drop across the water supply valve.

7. In a system of the character described, a combined pressure regulating and desuperheating valve adapted to be inserted in a steam supply line, a water supply valve controlling the supply of the desuperheating water to the first named valve, means actuated by movement of the first named valve for varying the opening of the water supply valve in proportion to the change of opening of the first named valve, a water pressure control valve controlling the supply of water to said water supply valve, means for moving said control valve in response to variations in pressure drop across said water supply valve whereby to maintain a set pressure drop across the water supply valve, and means for adjusting the water pressure control valve whereby to vary the set pressure drop across the water supply valve, said adjusting means including a bleed valve and automatically operable means for moving said bleed valve.

KENNETH B. HOWELL.